United States Patent [19]

Gagliardi, Jr.

[11] Patent Number: 5,779,532
[45] Date of Patent: Jul. 14, 1998

[54] METHOD OF MAKING CHICKEN RIBS PRODUCT FROM WHOLE CHICKEN

[75] Inventor: Eugene D. Gagliardi, Jr., Atglen, Pa.

[73] Assignee: Visionary Design, Inc., Atglen, Pa.

[21] Appl. No.: 905,418

[22] Filed: Aug. 4, 1997

[51] Int. Cl.$^6$ .................................................. A22C 21/00
[52] U.S. Cl. ........................................ 452/149; 452/135
[58] Field of Search ................................ 452/149, 135, 452/160

[56] References Cited

U.S. PATENT DOCUMENTS

| | | | |
|---|---|---|---|
| 3,570,050 | 3/1971 | Draper et al. | 452/149 |
| 4,385,419 | 5/1983 | Cantrell . | |
| 4,849,245 | 7/1989 | Galbraith | 452/149 |
| 5,088,957 | 2/1992 | Gagliardi, Jr. | 452/149 |
| 5,194,035 | 3/1993 | Dillard . | |
| 5,269,722 | 12/1993 | Diesing et al. | 452/136 |
| 5,314,374 | 5/1994 | Koch et al. | 452/149 |
| 5,370,573 | 12/1994 | Warren et al. | 452/149 |
| 5,562,532 | 10/1996 | Horst et al. . | |

FOREIGN PATENT DOCUMENTS 429887  11/1990  European Pat. Off. .

*Primary Examiner*—Willis Little
*Attorney, Agent, or Firm*—Panitch Schwarze Jacobs & Nadel, P.C.

[57] ABSTRACT

A method of cutting a whole chicken carcass into a chicken ribs product includes the steps of removing wings, hind quarters and breast lobes from the carcass to form a stripped carcass containing ribs and tenders. Next, the tenders are cut along the keel bone, the backbone is removed, and the rib cage is split into two sides, leaving the keel bone attached to one of the two sides, and leaving a tender attached to each side. The keel bone is stripped off, thereby creating two chicken rib products, each having ribs, rib meat and a tender thereon. The tenders may also be removed to form two chicken rib products, each having ribs and rib meat thereon.

16 Claims, 7 Drawing Sheets

METHOD OF MAKING CHICKEN RIBS PRODUCT FROM WHOLE CHICKEN

BACKGROUND OF THE INVENTION

The present invention relates generally to a method of cutting a whole chicken into a chicken ribs product.

Slaughtered chickens may be sold as either whole chicken carcasses, or as individual chicken parts. There is a ready market for almost all parts of a chicken. Thus, there is very little waste associated with chicken carcasses. However, there are still some parts of a whole chicken carcass which are not popular or desirable with the consuming public. One such part is the rib cage which contains small quantities of meat between the individual ribs and closely surrounding the ribs. This meat is difficult to remove with automated equipment. Thus, the rib cage is usually discarded or used for non-human consumption purposes or comminuted after all of the parts have been removed from the rib cage. One type of chicken part sold today has a half or quarter breast, with a portion of ribs and rib meat attached thereto. However, in making this part, only a portion of the rib cage is used. Also, since the breast has the highest commercial value, per pound, of all chicken parts, the breast is more valuable if it can be sold without any ribs or rib meat.

Accordingly, there is a need for a method of using the entire chicken rib cage to increase the potential "per pound" profit of a whole chicken carcass, while also developing new types of chicken products to attract additional consumers. The present invention fulfills such needs by providing a method for cutting the whole chicken carcass into a chicken tender and ribs product or a chicken ribs product which have sufficient perceived value to be marketed as a separate chicken item.

BRIEF SUMMARY OF THE INVENTION

The present invention provides a method of cutting a breast half of chicken into a chicken tender and ribs product, and a chicken product formed therefrom. The breast half of chicken is formed from a whole chicken carcass which has had its hind quarters and wings removed. The method comprises the steps of removing left and right breast lobes from the rib cage of the breast half, cutting along left and right outer wall surfaces of the keel bone to release the tenders from the keel bone, removing the backbone, releasing a front end of the keel bone from the surrounding cartilage, separating left and right sides of the rib cage from each other to which it is attached, the keel bone remaining attached to either the left or right side during the separation, and separating the keel bone from either the left or right side of the rib cage. This process results in two chicken ribs products, each having ribs, rib meat and a tender thereon. The backbone may be removed by cutting through the ribs close to the backbone so that substantially all of the ribs remain on the rib cage. The keel bone may be released from the surrounding cartilage by making a cut in a back end of the keel bone.

The present invention also includes a method of cutting a whole chicken carcass into a chicken tender and ribs product, wherein the process set forth above includes an initial step of removing the wings and hind quarters from the whole chicken carcass.

The present invention also includes a method of cutting a whole chicken or a breast half of chicken into a chicken ribs product, wherein the process set forth above is modified to completely remove the tenders, along with the breast lobes, thereby creating two chicken ribs products, each having only ribs and rib meat thereon.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
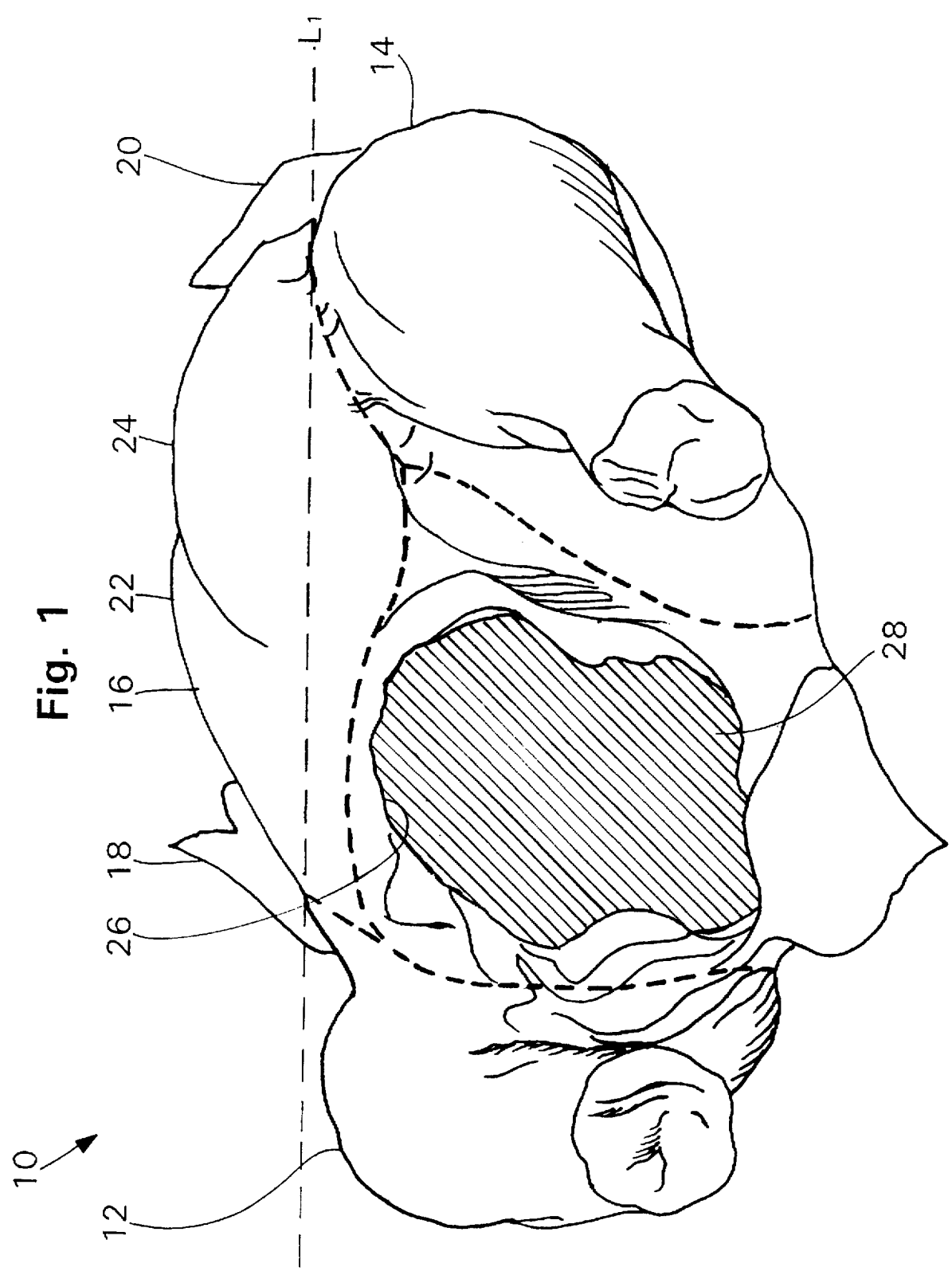
FIG. 1 is a perspective view of a prior art uncooked, whole chicken, and shows initial steps for cutting the whole chicken into a chicken rib product.

Certain terminology is used herein for convenience only and is not be taken as a limitation on the present invention. In the drawings, the same reference numerals are employed for designating the same elements throughout the several figures.

DEFINITIONS

The following definitions are provided to promote understanding of the invention:

Whole Chicken Carcass—a whole chicken which has had its feathers, neck, feet and internal organs removed.

Hind Quarters Or Leg Quarters—rear portion of the whole chicken carcass including thighs and drumsticks, but not including any significant portion of the chicken breast.

Breat Half Of Chicken—front portion of the whole chicken carcass, including rib cage, keel bone, left and right breast lobes, and a back portion of the chicken. The wings are part of the breast half, but are removed to define a wingless breast half of chicken. The breast half of chicken also includes a wishbone which may optionally be removed, and usually includes a small portion of the chicken neck.

Tender Or Tenderloin—fillet strip located along either side of the keel bone, adjacent to the breast lobe of the respective side. There are two tenders on each breast of chicken, located underneath respective left and right breast lobes. Each tender is attached along a portion of its surface to the keel bone, and along another portion of its surface to the rib cage. The tender is a natural muscle which may be removed from the breast half as a single piece. There is a natural seam between each breast lobe and tender.

Body Cavity (also known as the chest cavity or internal cavity)—area of the breast half of chicken defined by the rib cage.

FIG. 1 shows a whole chicken carcass 10. The carcass 10 has a rear portion defined by the region below and generally to the left of imaginar0y line $L_1$ (in the orientation of FIG. 1) which includes left and right hind quarters 12 and 14 of the chicken carcass 10, and a front portion defined by the region above and generally to the right of imaginary line $L_1$ (in the orientation of FIG. 1) which includes the breast half 16 of the chicken carcass 10. The breast half 16 includes left and right chicken wings 18 and 20, and left and right breast lobes 22 and 24. A rib cage 26 is underneath the breast lobes 22 and 24, and is partially visible through the eviscerated and fully cleaned body cavity 28 of the chicken carcass 10. Also, underneath the breast lobes 22 and 24, and thus not visible in FIG. 1, are the wishbone, tenders and keel bone, discussed in further detail below. The frontmost portion of the breast half 16 (which is the rightmost portion in the orientation of FIG. 1) usually includes a small remnant of the chicken neck (not shown) depending on how much of the neck was previously removed to form the carcass 10.

In FIG. 1, the skin has not been removed from the chicken parts. To more clearly illustrate the present invention, the remaining figures show the chicken parts without skin. However, it is not necessary to remove any skin to practice the invention.

FIGS. 2, 3, 4A, 4B, 5A and 5B illustrate, in a stepwise manner, the method of cutting the whole chicken carcass 10 of FIG. 1 to form the chicken ribs products. All of the cutting steps are preferably performed with either a sharp knife, a sharp manual cutting instrument, a saw, a power cutting device, or automated deboning apparatus. During the cutting and deboning steps, the chicken carcass 10 may be manipulated manually, or may be mounted on a deboning cone by placing the cone into the body cavity 28, and maintaining it thereon. Examples of automated processes for cutting chicken carcasses wherein the carcasses are mounted on deboning cones are shown in U.S. Pat. Nos. 5,194,035 (Dillard) and 4,385,419 (Cantrell).

When starting with a whole chicken carcass 10 shown in FIG. 1, the first step in the process of the present invention is to remove the hind quarters 12 and 14 and wings 18 and 20, leaving behind the breast half 16. These parts may be removed in any conventional manner. For example, U.S. Pat. No. 5,194,035 (Dillard) discloses an automated process for separating hind quarters from breast halves.

Figure 2:
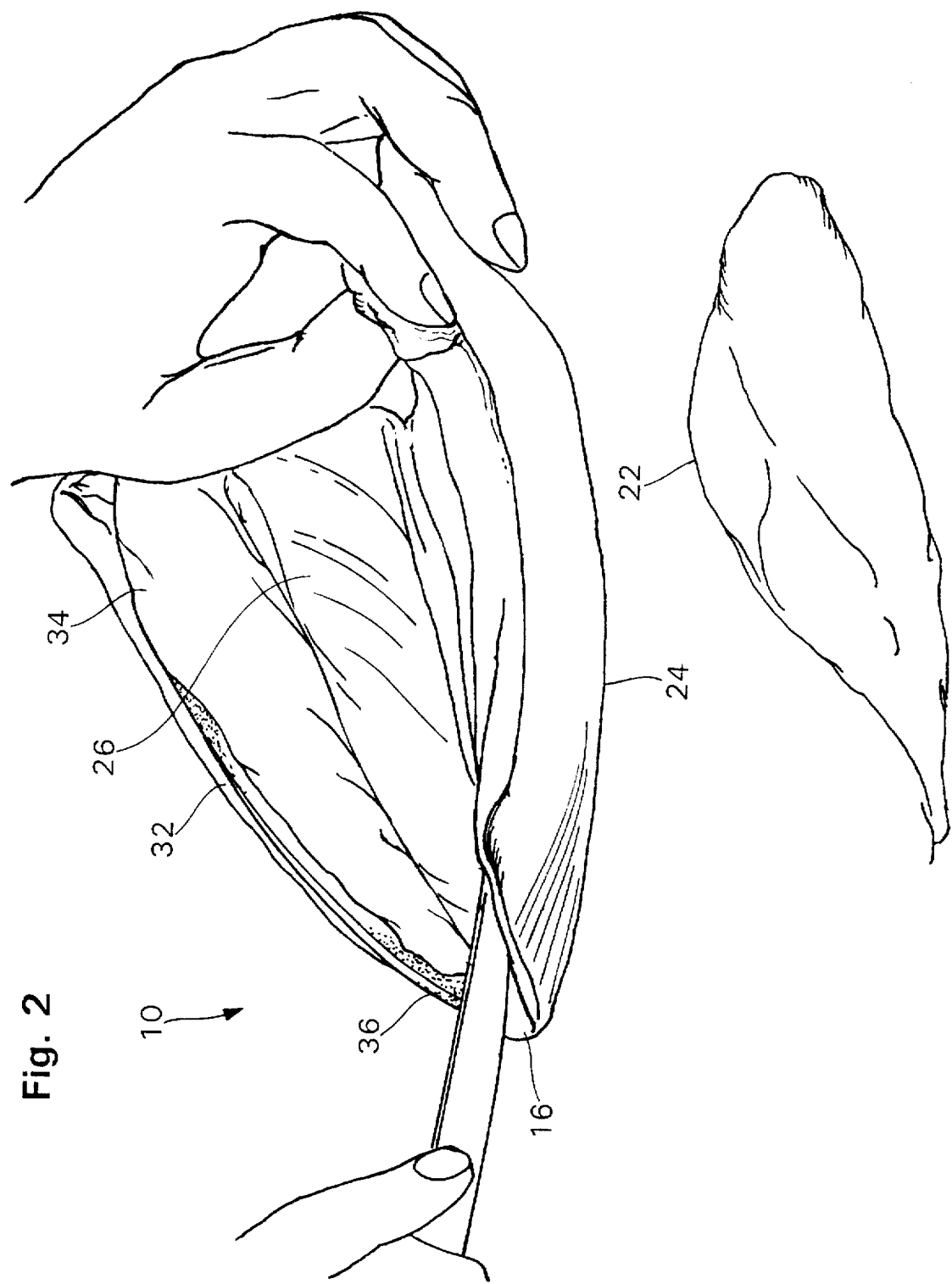
FIGS. 2, 3, 4A, 4B, 5A and 5B are perspective views of steps in the process of the present invention for cutting the whole chicken of FIG. 1 into a chicken rib product.

FIG. 2 shows a wingless, skinless breast half 16 formed from the carcass 10 of FIG. 1 as it appears before completing the next step in the process, namely, removal of the left and right breast lobes 22 and 24 from the rib cage 26. This step may also be performed in any conventional or automated manner. In FIG. 2, the left breast lobe 22 has been completely removed from the rib cage 26 of the breast half 16, and the right breast lobe 24 is shown shortly before the final cut is made to remove it from the rib cage 26 of the breast half 16. After removal of both breast lobes 24 and 26, left and right tenders 32 and 34 become visible along either side of keel bone 36. Hereafter, the breastless carcass 10 is referred to as carcass 10'.

Figure 3:
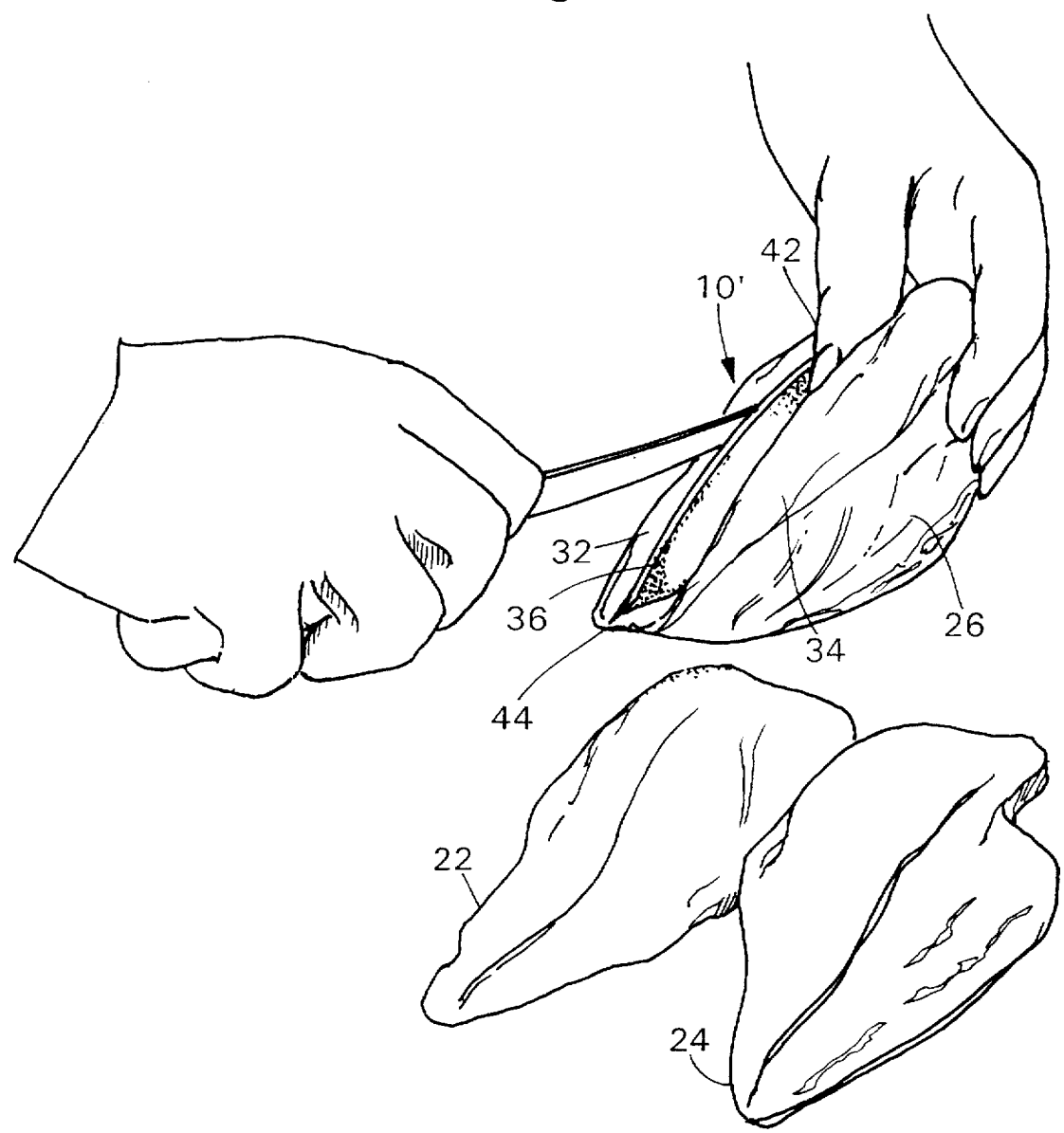

FIG. 3 shows the next step in the process, which is to release the tenders 32 and 34 from the keel bone 36, or from the keel bone 36 and the rib cage 26. As discussed above, each tender 32, 34 is attached along a portion of its surface to the keel bone 36, and along another portion of its surface to the rib cage 26. In a first embodiment of the invention, the tenders 32 and 34 remain attached to the rib cage 26 of the carcass 10', and thus are released only from the keel bone 36. In a second embodiment of the invention, the tenders 32 and 34 are completely removed from the carcass 10', and thus are released from the keel bone 36 and the rib cage 26. FIG. 3 shows the first embodiment of the invention. Complete removal of the tenders 32 and 34 may be performed manually or by conventional automated means. One machine which removes both tenders and breasts at the same time is disclosed in U.S. Pat. No. 5,562,532 (Horst et al.).

To release the tenders 32 and 34 from the keel bone 36, a cut is made along left and right outer surfaces of the keel bone 36 from the front 42 to the back 44 of the keel bone 36.

FIG. 3 also shows the left and right breast lobes 22 and 24 removed in the step of FIG. 2.

Figure 4A:
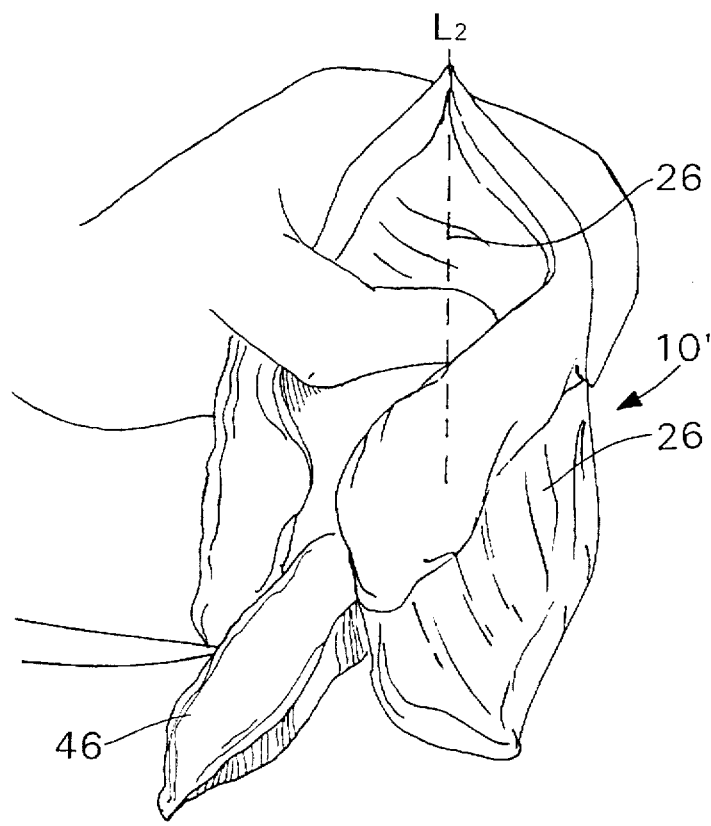
Figure 4B:
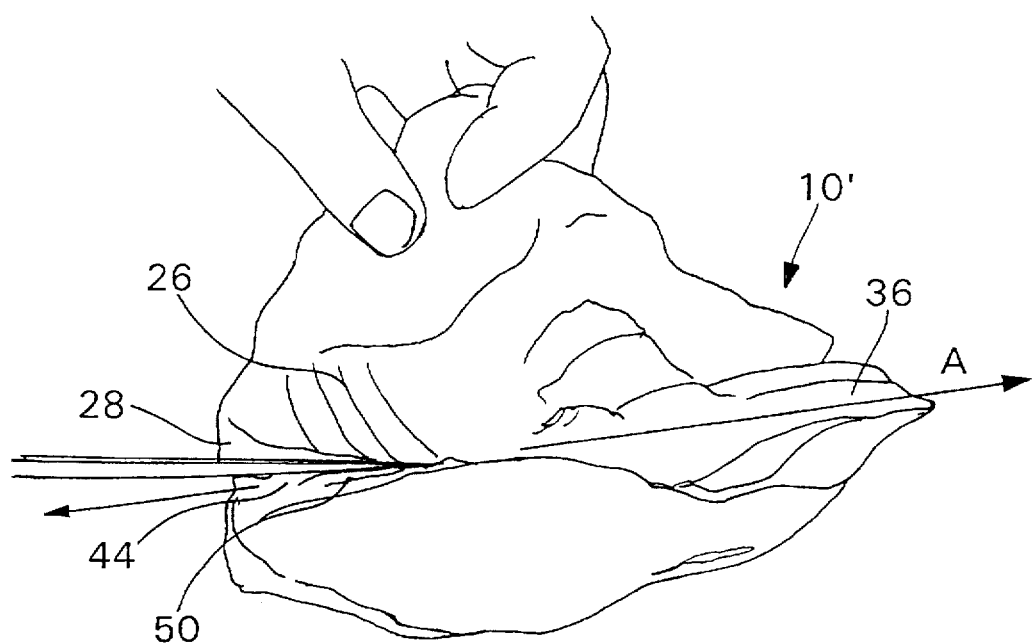

FIGS. 4A and 4B shows the next two steps in the process. The carcass 10' in FIGS. 4A and 4B is flipped over from the orientation shown in FIG. 3 to better illustrate the steps. Referring to FIG. 4A, backbone 46 is removed from the carcass 10' by cutting through individual ribs close to the backbone 46 so that substantially all of the ribs 48 remain on the rib cage 26. This step is contrary to prior art methods used to form chicken parts, such as combination breast and rib parts, wherein a significant portion of the ribs are usually removed with the backbone 46.

FIG. 4A also shows an imaginary line $L_2$ extending through the portion of the rib cage behind the backbone 46, and is explained in further detail with respect to FIG. 5.

Referring next to FIG. 4B, a small cut 50 is made in the back end 44 of the keel bone 36, near the neck remnant (not shown). The cut 50 is made in a center region of the back end 44 parallel to the longitudinal axis A of the keel bone 36, and preferably extends through the entire thickness of the keel bone 36. The keel bone 36 is primarily cartilage in this region. The cut 50 is preferably made from the internal side (i.e., the side facing the cavity 28) of the keel bone 36. This cutting step may also be referred to as nicking the keel bone 36. The cut 50 allows the keel bone 36 to easily break away from one side of the rib cage 26 during the breaking and separation step described below with respect to FIG. 5.

Figure 5A:
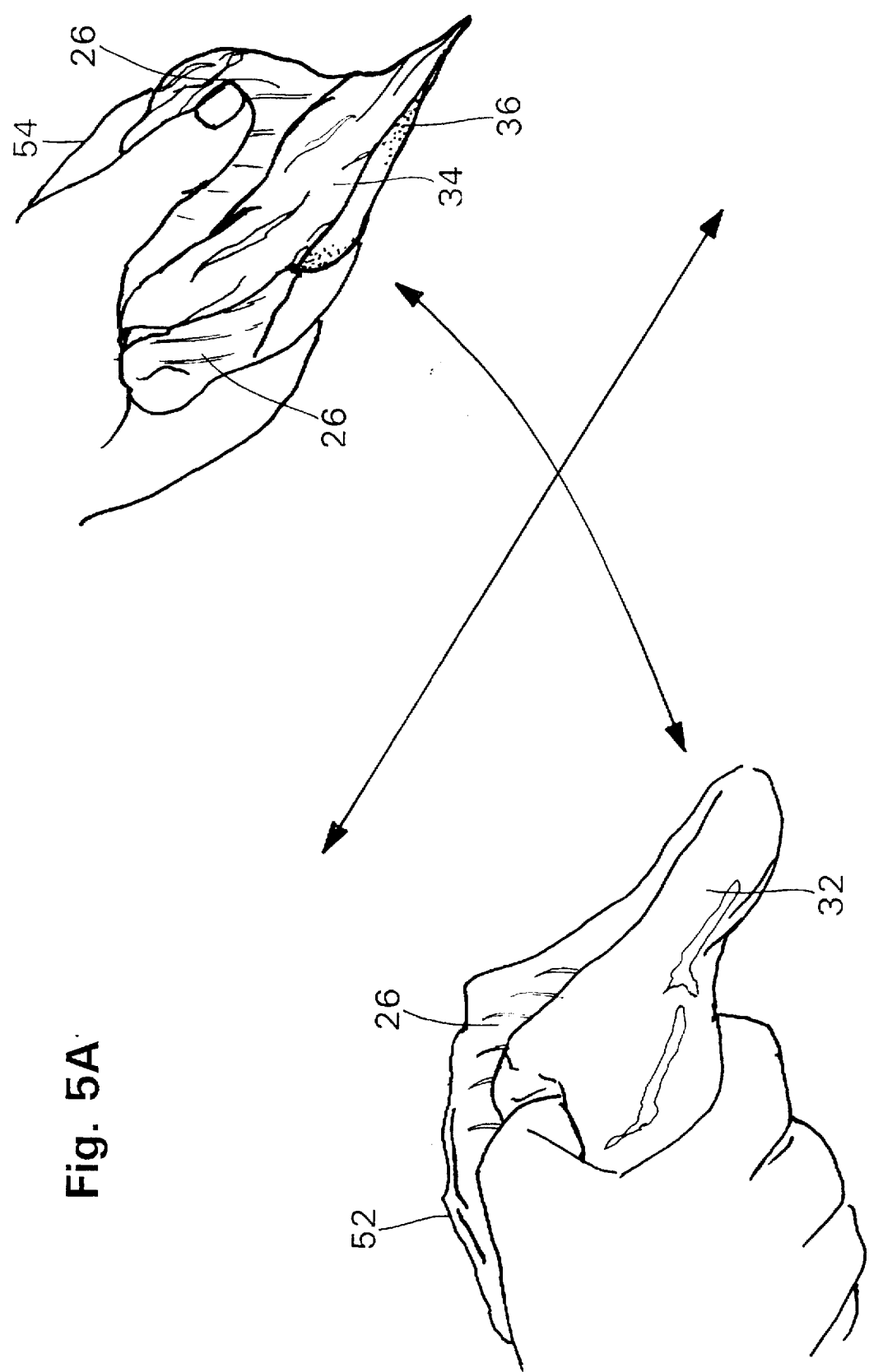
Figure 5B:
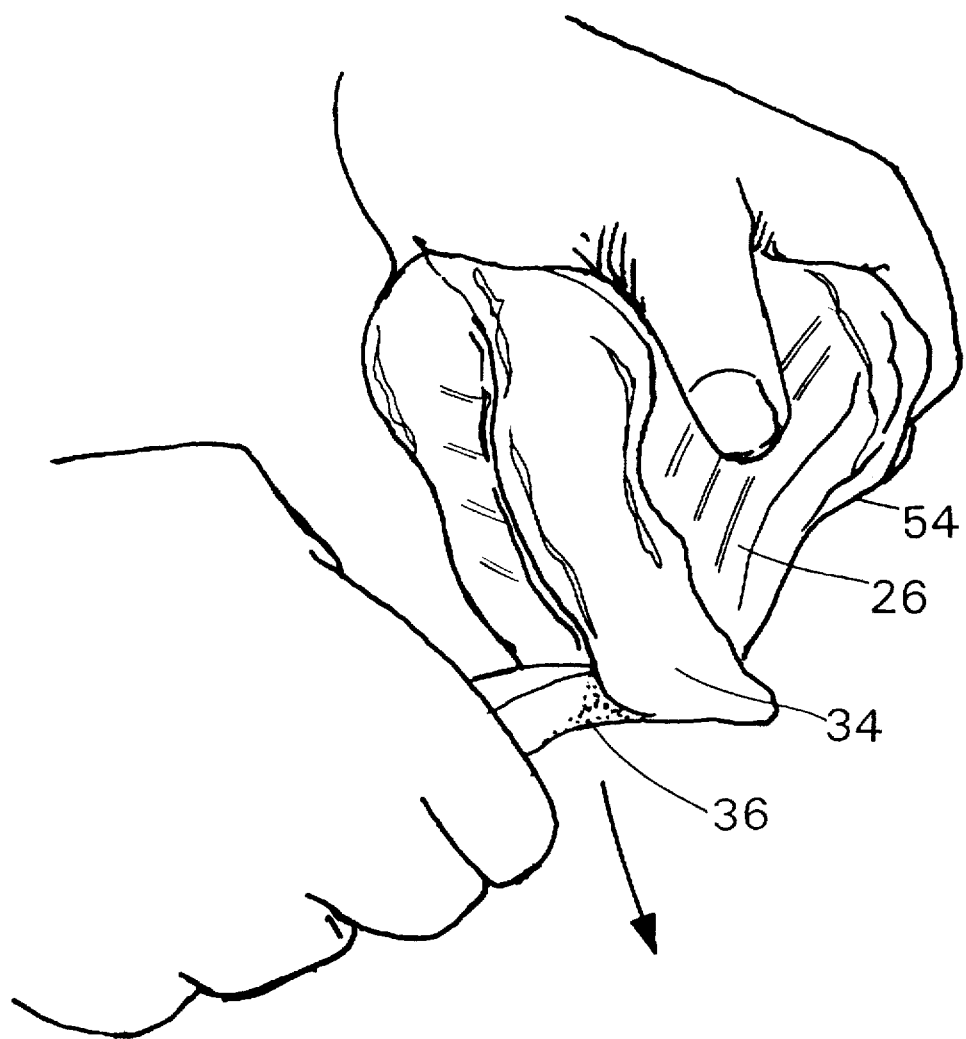

FIGS. 5A and 5B show the next two steps in the process. Referring to FIGS. 5A, the rib cage 26 of FIG. 4B is separated into a left and a right side 52 and 54 by breaking apart the rib cage 26 along imaginary line $L_2$ of FIG. 4A. During the separation, the keel bone 36 will remain attached to either the left or right side of the rib cage 26, depending upon which side it is more firmly attached to before separation.

Referring next to FIG. 5B, the keel bone 36 is cut or pulled off from whichever side it remains attached to. In FIG. 5A, the keel bone 36 remained attached to the right side 54. If the tender release cut in FIG. 3 is made properly, the keel bone should easily strip away from the side of the rib cage 26 that it is left attached to (right side 54 in FIG. 5A) and should not have any significant quantities of tender 32 or 34 attached thereto. Thus, substantially all of the tender 32 and 34 should remain attached to respective left and right rib sides 52 and 54.

Figure 6B:
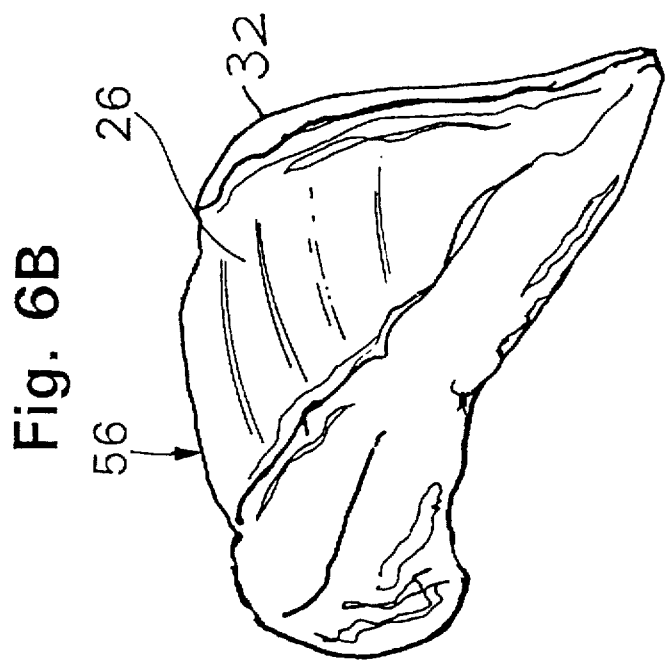
FIGS. 6A and 6B are inside and outside views of a resultant chicken rib product, as created by the steps of FIGS. 2, 3, 4A, 4B, 5A and 5B.
Figure 6A:
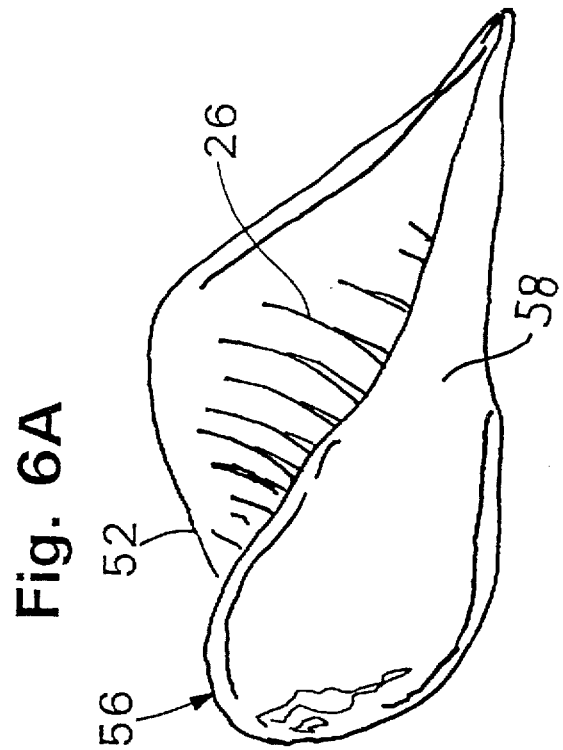

FIGS. 6A and 6B are, respectively, inside and outside views of a resultant chicken rib product 56, as created by the process described above. The chicken rib product 56 includes either a left or a right side of ribs 52 or 54 (52 being shown in FIG. 6A) from the rib cage 26 and any rib meat 58 attached thereto. The chicken rib product 56 also includes a portion of the scapula bone. In the first embodiment of the invention, the chicken rib product 56 includes a tender 32 or 34 (not visible in FIG. 6A, but shown as 32 in FIG. 6B) firmly attached to the ribs 52. In the second embodiment of the invention, the tenders 32 and 34 are both completely removed from the carcass 10', and thus do not form part of the resultant chicken rib product.

In the second embodiment of the invention, the tenders 32 and 34 may be removed at any time during or after removal of the breast lobes 22 and 24. In one embodiment of the invention, the tenders 32 and 34 are removed from the carcass 10' as a final step in the process (i.e., after the steps in FIGS. 5A and 5B are completed).

The resultant chicken rib products (i.e., ribs and tender, and ribs without tender) may be marinated and oven-roasted, or cooked in Old Bay® Seasoning, barbecue sauce, or hot wing sauce. Other methods for cooking poultry products may be used instead. The chicken rib and tender product, when formed from an average size carcass 10 contains about 3–5 ounces of meat, most of which is in the tender 52. The chicken rib product without the tender contains about 1 to about 1½ ounces of meat. Both products are fun eating snack foods, suitable for bars, hors d'oeuvres, and the like. Both products eat like hardshell crabs, but with more meat.

Both products allow for better use of the chicken rib cage than present chicken processing methods. Presently, tenders on chickens which are cut up for parts are completely removed and sold separately as boneless white meat, and the rib meat between the individual ribs and closely surrounding the ribs is not sold separately and is often discarded. Heretofore, there has been no known techniques for marketing this portion of the chicken carcass. In the first embodiment of the invention, the tenders are left on the ribs, and a fun and attractive chicken product may be marketed to bars, restaurants and supermarkets. In the second embodiment of the invention (ribs without tender), the chicken product may also be marketed as a fun, snack food, especially when prepared with seasonings or sauce.

While conventional manual and automated techniques may be used to cut and remove parts from the carcass 10 and 10', specialized automated equipment may be designed to allow the entire process to be performed on an assembly line, and to perform the unique steps associated with backbone removal, tender/keel bone trimming, keel bone nicking and removal, and rib cage splitting.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of cutting a whole chicken carcass into a chicken tender and ribs product, the method comprising the steps of:
   (a) removing the wings and hind quarters from the whole chicken carcass, thereby forming a wingless breast half of the chicken carcass;
   (b) removing left and right breast lobes from the rib cage of the breast half;
   (c) cutting along left and right outer wall surfaces of the keel bone to release the tenders from the keel bone;
   (d) removing the backbone;
   (e) releasing a front end of the keel bone from the surrounding cartilage;
   (f) separating left and right sides of the rib cage from each other to which it is attached, the keel bone remaining attached to either the left or right side during the separation; and
   (g) separating the keel bone from either the left or right side of the rib cage, thereby creating two chicken ribs products, each having ribs, rib meat and a tender thereon.

2. A method according to claim 1 wherein step (e) is performed by making a cut in a back end of the keel bone.

3. A method according to claim 1 wherein step (d) is performed by cutting through the ribs close to the backbone so that substantially all of the ribs remain on the rib cage.

4. A chicken product formed in accordance with the method of claim 1.

5. A method of cutting a whole chicken carcass into a chicken ribs product, the method comprising the steps of:
   (a) removing the wings and hind quarters from the whole chicken carcass, thereby forming a wingless breast half of the chicken carcass;
   (b) removing left and right breast lobes and left and right tenders from the rib cage of the breast half;
   (c) removing the backbone;
   (d) releasing a front end of the keel bone from the surrounding cartilage;
   (e) separating left and right sides of the rib cage from each other to which it is attached, the keel bone remaining attached to either the left or right side during the separation; and
   (f) separating the keel bone from either the left or right side of the rib cage, thereby creating two chicken ribs products, each having ribs and rib meat thereon.

6. A method according to claim 5 wherein step (d) is performed by making a cut in a back end of the keel bone.

7. A method according to claim 5 wherein step (c) is performed by cutting through the ribs close to the backbone so that substantially all of the ribs remain on the rib cage.

8. A chicken product formed in accordance with the method of claim 5.

9. A method of cutting a breast half of chicken into a chicken tender and ribs product, the breast half of chicken being formed from a whole chicken carcass which has had its hind quarters and wings removed, the method comprising the steps of:
   (a) removing left and right breast lobes from the rib cage of the breast half;
   (b) cutting along left and right outer wall surfaces of the keel bone to release the tenders from the keel bone;
   (c) removing the backbone;
   (d) releasing a front end of the keel bone from the surrounding cartilage;
   (e) separating left and right sides of the rib cage from each other, the keel bone remaining attached to either the left or right side during the separation; and
   (f) separating the keel bone from either the left or right side of the rib cage to which it is attached, thereby creating two chicken ribs products, each having ribs, rib meat and a tender thereon.

10. A method according to claim 9 wherein step (d) is performed by making a cut in a back end of the keel bone.

11. A method according to claim 9 wherein step (c) is performed by cutting through the ribs close to the backbone so that substantially all of the ribs remain on the rib cage.

12. A chicken product formed in accordance with the method of claim 9.

13. A method of cutting a breast half of chicken into a chicken tender and ribs product, the breast half of chicken being formed from a whole chicken carcass which has had its hind quarters and wings removed, the method comprising the steps of:
   (a) removing left and right breast lobes and left and right tenders from the rib cage of the breast half;
   (b) removing the backbone;
   (c) releasing a front end of the keel bone from the surrounding cartilage;
   (d) separating left and right sides of the rib cage from each other, the keel bone remaining attached to either the left or right side during the separation; and
   (e) separating the keel bone from either the left or right side of the rib cage to which it is attached, thereby creating two chicken ribs products, each having ribs and rib meat thereon.

14. A method according to claim 13 wherein step (c) is performed by making a cut in a back end of the keel bone.

15. A method according to claim 13 wherein step (b) is performed by cutting through the ribs close to the backbone so that substantially all of the ribs remain on the rib cage.

16. A chicken product formed in accordance with the method of claim 13.

* * * * *